(12) United States Patent
Louvrier et al.

(10) Patent No.: US 10,952,308 B2
(45) Date of Patent: Mar. 16, 2021

(54) SYSTEM AND METHOD FOR PROTECTING A TRANSFORMER

(71) Applicant: GENERAL ELECTRIC COMPANY, Schenectady, NY (US)

(72) Inventors: Yannick Louvrier, Buc (FR); Christophe Robert, Buc (FR); Dominique Poincloux, Buc (FR); Denis Perrillat-Amede, Buc (FR); Philippe Ernest, Buc (FR)

(73) Assignee: GENERAL ELECTRIC COMPANY, Schenectady, NY (US)

(*) Notice: Subject to any disclaimer, the term of this patent is extended or adjusted under 35 U.S.C. 154(b) by 124 days.

(21) Appl. No.: 15/994,172

(22) Filed: May 31, 2018

(65) Prior Publication Data

US 2019/0150259 A1    May 16, 2019

(51) Int. Cl.
| | | |
|---|---|---|
| *H05G 1/10* | (2006.01) |
| *H05G 1/46* | (2006.01) |
| *H02H 7/04* | (2006.01) |
| *H01J 35/06* | (2006.01) |
| *H01J 35/10* | (2006.01) |

(52) U.S. Cl.
CPC ............ *H05G 1/10* (2013.01); *H01J 35/065* (2013.01); *H01J 35/101* (2013.01); *H02H 7/042* (2013.01); *H05G 1/46* (2013.01)

(58) Field of Classification Search
CPC . H05G 1/10; H05G 1/46; H01J 35/065; H01J 35/101; H02H 7/042
See application file for complete search history.

(56) References Cited

U.S. PATENT DOCUMENTS

| | | | |
|---|---|---|---|
| 4,698,582 A | 10/1987 | Braun et al. | |
| 4,868,842 A | 9/1989 | Dowd | |
| 5,689,180 A * | 11/1997 | Carlson | H01F 19/08 323/359 |
| 6,212,256 B1 | 4/2001 | Miesbauer et al. | |
| 6,985,557 B2 | 1/2006 | Jaafar | |
| 2004/0114722 A1 | 6/2004 | Shimono | |
| 2006/0023841 A1* | 2/2006 | Beyerlein | H05G 1/12 378/104 |
| 2008/0285716 A1 | 11/2008 | Tang et al. | |
| 2009/0304157 A1 | 12/2009 | Fuerst et al. | |

* cited by examiner

*Primary Examiner* — Courtney D Thomas
(74) *Attorney, Agent, or Firm* — Grogan, Tuccillo & Vanderleeden, LLP

(57) ABSTRACT

A system for protecting a transformer is provided. The system includes an inductor electrically disposed between the transformer and a load powered by the transformer, and a resistor electrically disposed in parallel with the inductor between the transformer and the load.

20 Claims, 6 Drawing Sheets

SYSTEM AND METHOD FOR PROTECTING A TRANSFORMER

CROSS REFERENCE TO RELATED APPLICATIONS

This application claims priority to and the benefit of French Patent Application Demand No.: 1,760,588 filed on Nov. 10, 2017, which is hereby incorporated by reference in its entirety.

BACKGROUND

Technical Field

Embodiments of the invention relate generally to medical imaging systems, and more specifically, to a system and method for protecting a transformer from short circuits.

Discussion of Art

Many imaging systems utilize X-ray tubes to generate images of an object. X-ray tubes generally include a cathode disposed at a distance from an anode within a vacuum vessel. The anode usually includes an impact zone that is generally fabricated from a refractory metal with a high atomic number, such as tungsten or tungsten alloy. A voltage difference is maintained between the cathode and the anode such that an electron beam, also referred to herein as the "tube current", is generated by the cathode and strikes the anode within the impact zone, typically called the focal spot. The tube current is typically supplied by a transformer. As electrons within the electron beam impact the anode, their kinetic energy is converted to high-energy electromagnetic radiation, e.g., X-rays.

In many X-ray tubes, short circuits, also referred to herein as "spits" and "spit currents", occur between the anode and the cathode as a result of high frequency physical phenomenon occurring within the X-ray tube. As will be appreciated, short circuits between the anode and cathode of an X-ray tube may damage one or more components of the transformer, e.g., resistors, inductive coils, transistors, output capacitors, diodes, etc., powering the tube current.

What is needed, therefore, is an improved system and method for protecting a transformer from short circuits.

BRIEF DESCRIPTION

In an embodiment, a system for protecting a transformer is provided. The system includes an inductor electrically disposed between the transformer and a load powered by the transformer, and a resistor electrically disposed in parallel with the inductor between the transformer and the load.

In another embodiment, a method for protecting a transformer is provided. The method includes powering a load with the transformer such that a DC electrical current flows from the transformer through a damping circuit to the load. The damping circuit includes an inductor and a resistor electrically disposed in parallel between the transformer and the load.

In yet another embodiment, an electromagnetic ray generator is provided. The electromagnetic ray generator includes an electron emitter, a transformer, an anode, an inductor, and a resistor. The electron emitter is operative to emit electrons. The transformer is operative to provide power to the electron emitter. The anode is operative to receive electrons emitted by the electron emitter and to convert kinetic energy of the electrons into electromagnetic rays. The inductor is electrically disposed between the transformer and the electron emitter. The resistor is electrically disposed in parallel with the inductor between the transformer and the electron emitter.

DRAWINGS

The present invention will be better understood from reading the following description of non-limiting embodiments, with reference to the attached drawings, wherein below:

Figure 1:
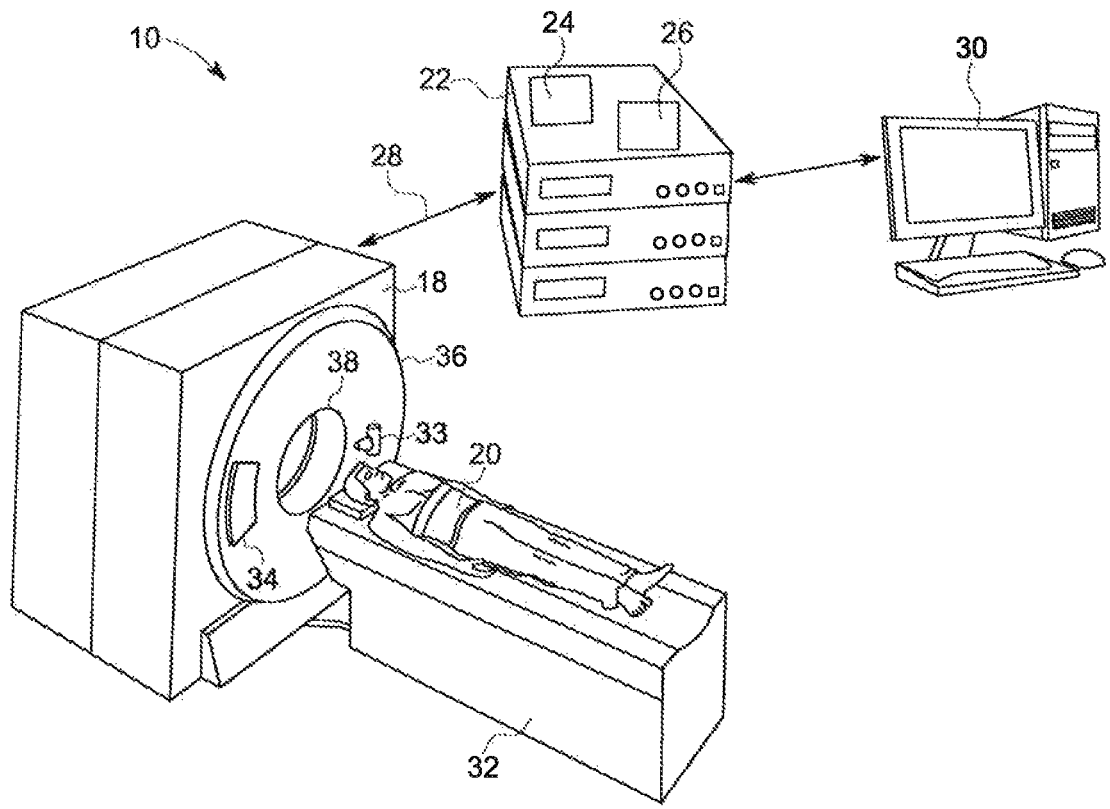
FIG. 1 is a schematic diagram of an imaging system that includes an electromagnetic ray generator having a system for protecting a transformer, in accordance with an embodiment of the present invention.
Figures 3, 4:
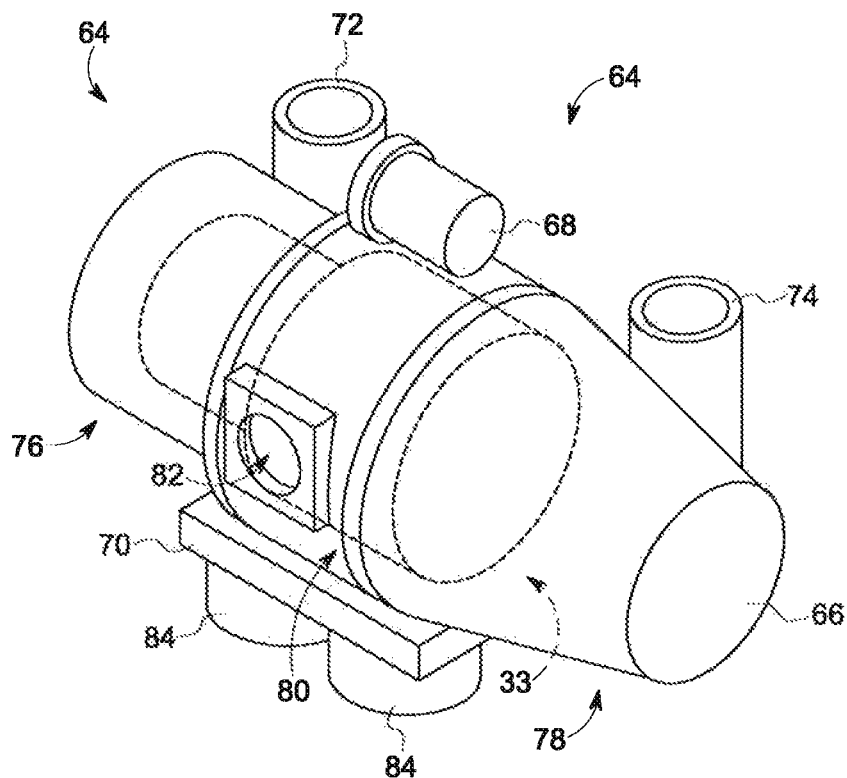
FIG. 3 is a diagram of a housing unit for the electromagnetic ray generator of the imaging system of FIG. 1, in accordance with an embodiment of the present invention.
Figure 5:
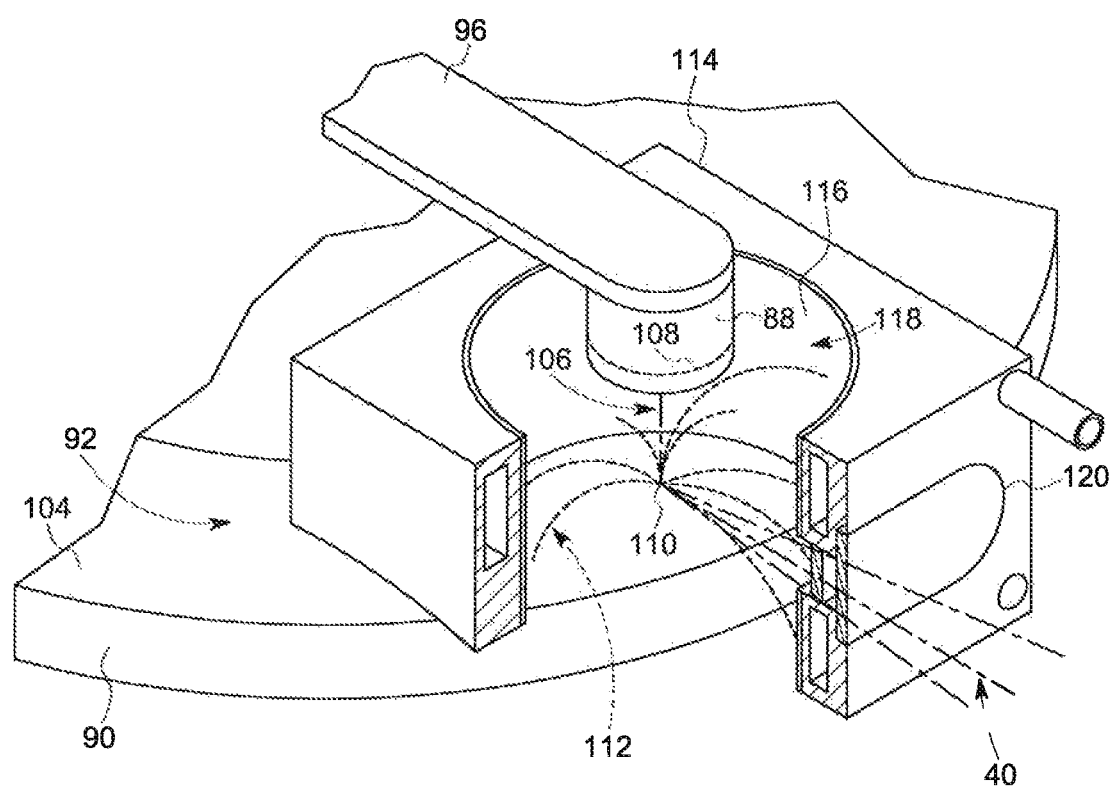
Figure 6:
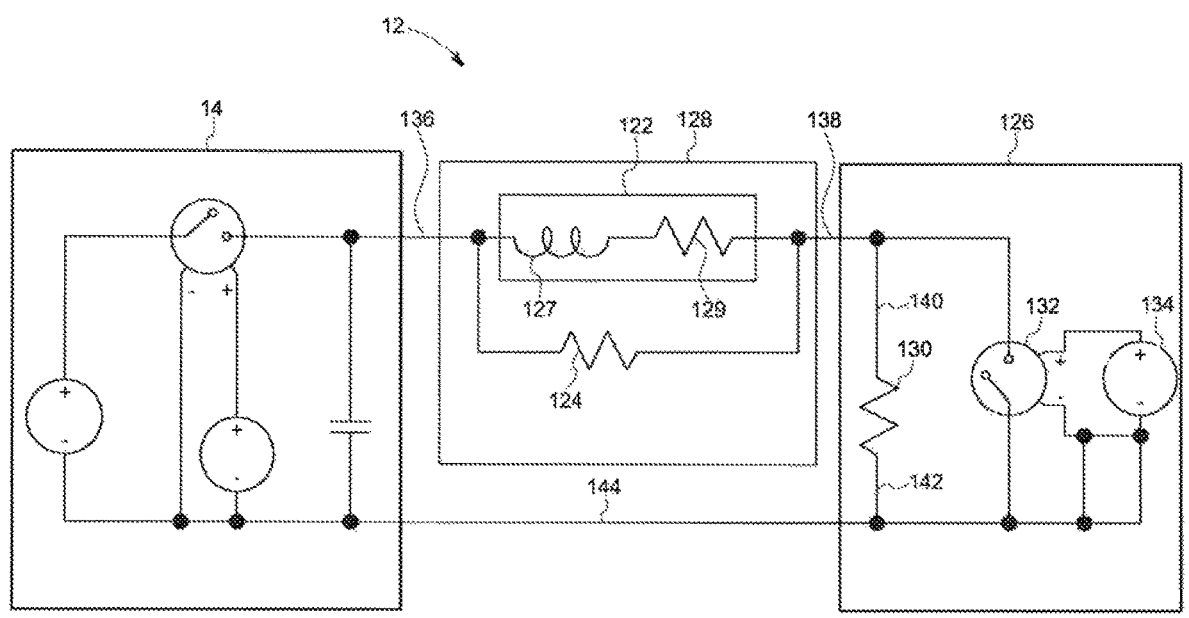
Figure 7:
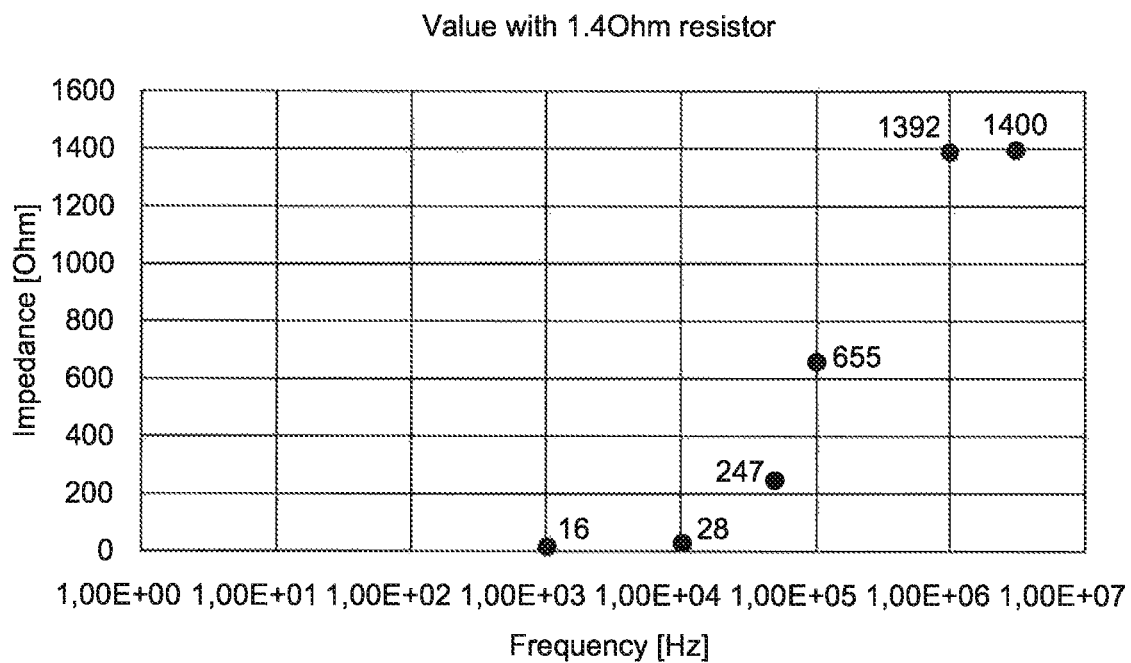
Figure 8:
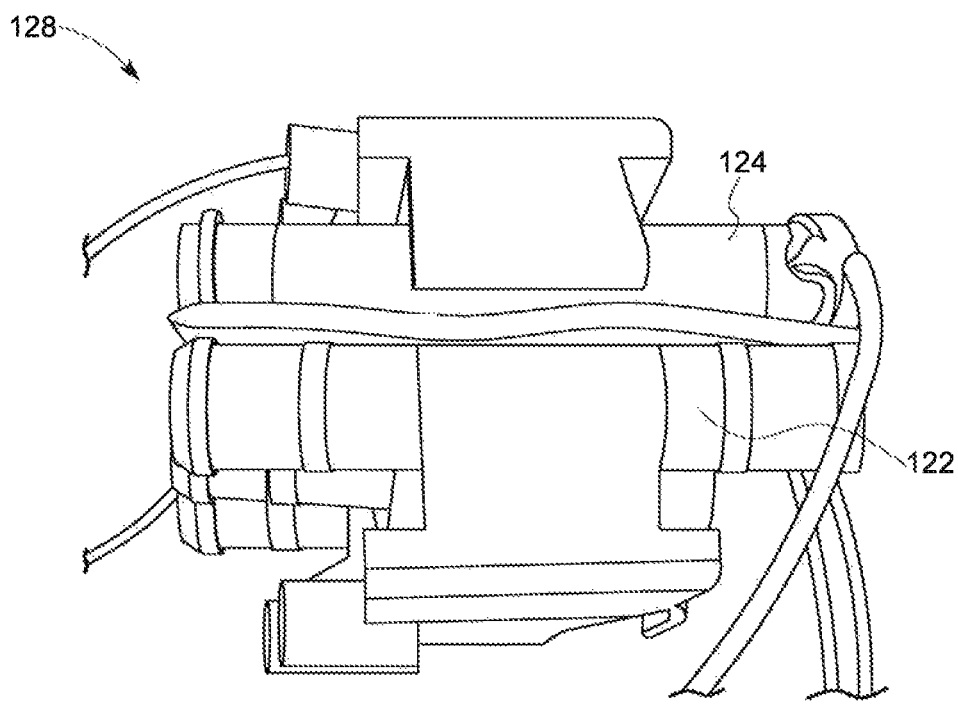
Figure 9:
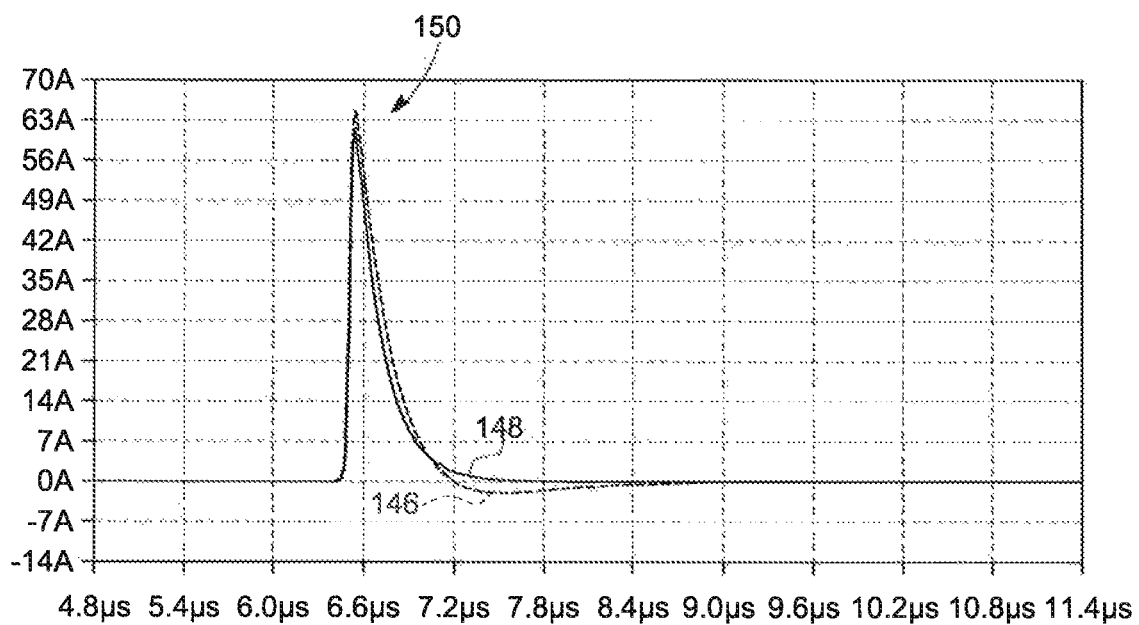

FIG. 4 is a perspective view of the electromagnetic ray generator of the imaging system of FIG. 1, wherein a motor of the electromagnetic ray generator has been exploded to reveal a stator, and wherein a portion of a vacuum vessel of the electromagnetic ray generator and a portion of the stator have been cutaway to reveal an anode of the electromagnetic ray generator mounted to a rotor of the motor, in accordance with an embodiment of the present invention;

FIG. 5 is a close up perspective view of an electron collector disposed within the electromagnetic ray generator of FIG. 4, wherein a portion of the electron collector has been cutaway to reveal a focal point of an electron beam on the anode, in accordance with an embodiment of the present invention;

FIG. 6 is an electronic schematic diagram of the system for protecting a transformer of the electromagnetic ray generator of the imaging system of FIG. 1, in accordance with an embodiment of the present invention;

FIG. 7 is a chart depicting the effective impedance of a damping circuit of the system for protecting a transformer of FIG. 6, in accordance with an embodiment of the present invention;

FIG. 8 is diagram of an embodiment of a damping circuit of the system for protecting a transformer of FIG. 6, wherein the damping circuit has a small form factor, in accordance with an embodiment of the present invention; and FIG. 9 is a chart depicting an electrical current flowing in a circuit of the system for protecting a transformer of FIG. 6 over time, in accordance with an embodiment of the present invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. Accordingly, the term "electrically disposed", as used herein with respect to one or more elements, refers to the arrangement/flow path of the electric coupling between the elements. For example, a first element and a second element are electrically disposed in parallel between a third element and a fourth element when the first, the second, the third, and the fourth elements are electrically coupled to each other such that the first element and the second element form a parallel electrical path between the third element and the fourth element.

The term "real-time," as used herein, means a level of processing responsiveness that a user senses as sufficiently immediate or that enables the processor to keep up with an external process. As further used herein, the terms "imaging procedure" and/or "medical imaging procedure" refer to a medical procedure that involves an imaging system to assist in accomplishing one or more tasks such as, but not limited to, deploying/installing a stent into a blood vessel, locating an ulcer, imaging a clogged artery, suturing a patient, and/or other medical processes. The term "vacuum," as used herein, means a pressure of about zero (0) psi.

As will be understood, the development of new electromagnetic ray generator technology has traditionally required increasing tube current power demands. Increases in tube current power demands, in turn, often require improvements in the power efficiency of electromagnetic ray generator components, and/or the components that power electromagnetic ray generators, e.g., a transformer, in order to mitigate the overall power demand on the main power supply driving an electromagnetic ray generator. As will be explained in greater detail below, embodiments of the present invention provide for systems and methods that improve power efficiency in a damping circuit that protects a transformer from short circuits/spit currents.

Additionally, while the embodiments disclosed herein are described with respect to an X-ray based imaging system, e.g., a computed tomography ("CT") imaging system, it is to be understood that embodiments of the present invention are equally applicable to other devices and/or imaging systems, for use in imaging procedures, which generate electromagnetic waves/radiation via striking an anode with an electron beam, and/or any system which involves a transformer powering a load. Further, embodiments of the present invention related imaging systems may be used to analyze objects within any material which can be internally imaged, generally. As such, embodiments of the present invention are not limited to analyzing objects within human tissue.

Accordingly, referring now to FIG. 1, the major components of an imaging system 10, suitable for use with a system for protecting a transformer 12 (FIG. 6), in accordance with an embodiment of the present invention, are shown. As depicted, the imaging system 10 includes a detector assembly 18 that is utilized to scan a patient 20, and a controller 22, which includes at least one processor 24 and a memory device 26. The controller 22 may electronically communicate with the detector assembly 18 via one or more communication links 28 over which data generated by the detector assembly 18 may be passed to the controller 22. As will be appreciated, in embodiments, the imaging system 10 may further include a human-machine interface ("HMI") 30, i.e., a work station, that provides for a user/technologist/physician to interact with the imaging system 10 and/or system 12. The imaging system 10 may further include a table 32 for supporting the patient 20 during scanning for a medical imaging procedure.

Figure 2:
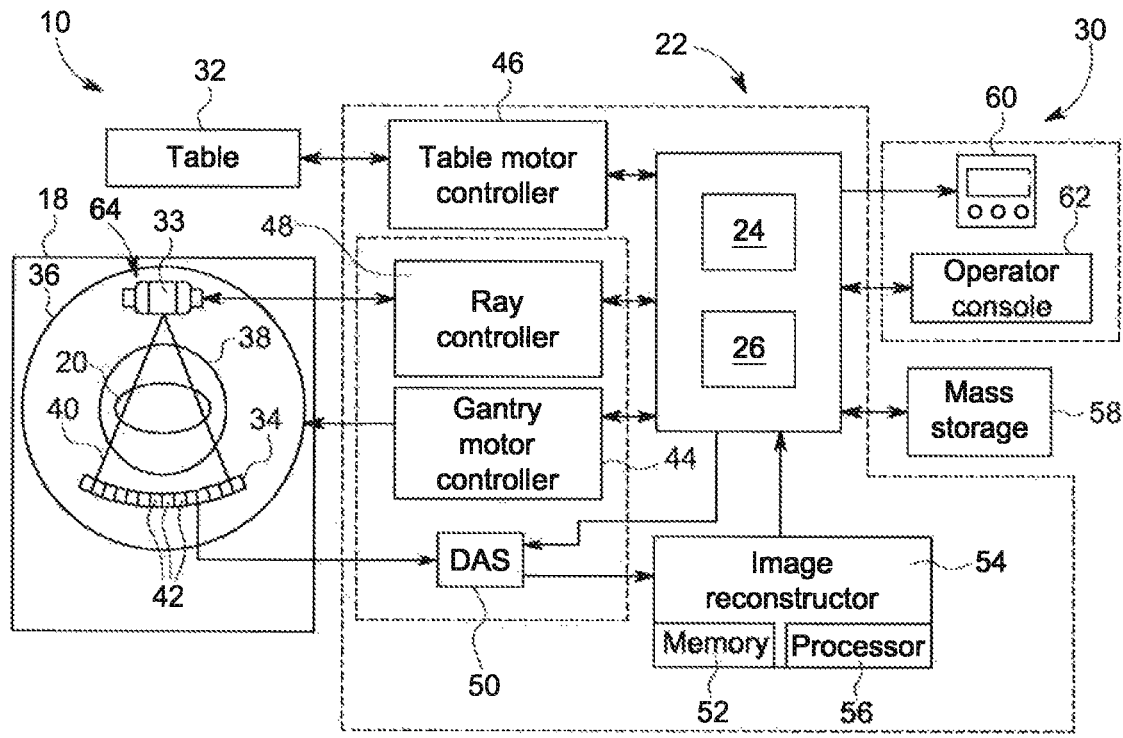
FIG. 2 is a block diagram of the imaging system of FIG. 1, in accordance with an embodiment of the present invention.

As illustrated in FIG. 2, the detector assembly 18 may include an electromagnetic ray generating device/ray generator 33 and a radiation detector 34 disposed within a rotating gantry 36 opposite one another. As will be understood, the patient 20 is positioned within a bore 38 of the gantry 36, and X-rays 40 generated/projected by the electromagnetic ray generator 33 are received by the radiation detector 34 after having passed through the patient 20 while the gantry 36 rotates about the patient 20. The radiation detector 34 may include an array of detector elements 42, each of which produces an electric signal representative of an impinging X-ray 40 beam. While the rays 40 generated by the electromagnetic ray generator 33 are disclosed herein as being X-rays, it will be understood that, in embodiments, the rays 40 may be other types of electromagnetic rays/waves, e.g., gamma rays, infrared waves, radio waves, etc.

The controller 22 may include a gantry motor controller 44, a table motor controller 46, a ray controller 48, and a data acquisition system ("DAS") 50. The table motor controller 46 governs actuation of a motor that moves the table 32 in relation to the detector assembly 18, the gantry motor controller 44 controls the rotational direction and/or speed of the gantry 36, the ray controller 48 provides power and timing signals to the ray generator 33, and the DAS 50 samples analog projection data from the detector elements 42 and converts the analog data to digital projection data for subsequent processing. For example, in embodiments, the digital projection data may be loaded from the DAS 50 into a memory 52 device of an image reconstructor 54 where it is used by a processor 56 to reconstruct one or more images via a reconstruction algorithm. The one or more images may then be sent to the HMI 30 and/or a mass storage device 58, e.g., a large computerized data storage apparatus such as a network attached storage ("NAS") device.

The HMI 30 includes a monitor 60 for displaying the reconstructed images, and a console 62, e.g., buttons, dials, a touch screen, a keyboard, and/or a mouse, for receiving command/scanning parameters from an operator of the systems 10 and/or 12.

Turning now to FIG. 3, the ray generator 33 may be disposed within a housing unit 64 which may include a container 66, a pump 68, a radiator 70, an anode receptacle 72, and/or a cathode receptacle 74.

The container 66 may be formed from lead and have an anode end 76, a cathode end 78, and a center section 80 disposed therebetween with an aperture/window 82. The ray generator 33 may be contained within the container 66 such that the generated rays 40 (FIG. 2) are able to pass through the aperture 82. The container 66 may be filled with air or a fluid, e.g., dielectric oil/transformer oil which, as will be discussed in greater detail below, is circulated throughout the container 66 via the pump 68 so as to cool/transfer heat away from the ray generator 33.

The radiator 70 may be disposed to one side of the center section 80 and fluidly connected to the interior of the container 66 such that the radiator 70 is able to cool the fluid by absorbing and radiating heat from it into the surrounding atmosphere. As shown in FIG. 3, in embodiments, the radiator 70 may include one or more fans 84 for providing a cooling air flow over the radiator 70 as the fluid circulates through it.

The anode 72 and cathode 74 receptacles serve as conduits through which electrical connections may be made to the ray generator 33 within the container 66.

Moving to FIG. 4, the ray generator 33 includes a vacuum enclosure/vessel 86 within which a vacuum and/or a near vacuum is maintained. The ray generator 33 further includes a cathode 88, an anode 90, and an electron collector 92, all of which are disposed within the vacuum vessel 86. The vacuum vessel 86 further includes an aperture 94 that aligns with the aperture 82 (FIG. 3) of the container 66 (FIG. 3). In embodiments, the electron collector 92 may partially protrude from the vacuum vessel 86 such that the vacuum within the vessel 86 is maintained. The cathode 88 may be mounted to the vacuum vessel 86 via an arm 96 and positioned such that it faces the anode 90. The anode 90 may be configured to rotate in relation to the cathode 88.

For example, in embodiments, the ray generator 33 may further include a motor formed by a stator 98 fastened to the vacuum vessel 86 and a rotor 100 mounted to the anode 90. As will be appreciated, the motor may be electric, pneumatic, or hydraulic, and/or disposed within a casing 102 that may be mounted to the vacuum vessel 86. The anode 90 may be a circular disk with a target track 104, e.g., a tungsten ring, disposed along the circumference of the anode 90 which aligns with the cathode 88. As will be appreciated, while the figures provided herein depict the ray generator 33 as including the vacuum vessel 86, it will be understood that, in other embodiments, the ray generator 33 may not include the vacuum vessel 86.

Turning to FIG. 5, in operation, a voltage is maintained, via the transformer 14 (FIG. 6), between the cathode 88 and the anode 90 such that an electron beam 106, i.e., a continuous stream of individual electrons, is generated/produced by/at an emitter 108 of the cathode 88 and strikes the anode 90 at a focal point 110 that falls within the target track 104. Upon striking the anode 90, the kinetic energy of some of the electrons within the electron beam 106 is converted into electromagnetic waves, i.e., the X-rays 40, which radiate out in all directions from the focal point 110. The focal point 110 and/or anode 90, however, may be located within the vacuum vessel 86 (FIG. 4) so as to increase the likelihood that individual X-rays 40 generated by the electrons striking the focal point 110 will pass through the apertures 82 (FIG. 3) and 94 (FIG. 4). As will be appreciated, the striking of anode 90 by the electron beam 106 generates heat within the portion of the anode 90 occupying the focal point 110. Accordingly, in embodiments, the anode 90 may be rotated by the rotor 100 so that the point of the target track 104 aligning with the focal point 110 shifts over time to provide points of the target track 104 an opportunity to cool in between cycles of being struck by the election beam 106.

As will be understood, some of the electrons 112 within the beam 106 backscatter away from the focal point 110 after striking the anode 90. In particular, some of the backscattered electrons 112 will be additionally deflected about ninety degrees (90°) or more by the negative electric charge of the electron beam 106 and/or cathode 88, and thus follow a curved path that re-strikes the anode 90 at a point other than the focal point 110, which, without the electron collector 92, would generate off-focal electromagnetic rays and/or additional/unwanted heat within the anode 90.

Accordingly, the electron collector 92 has a body 114 that includes/defines a surface/interface 116 configured to intercept the backscattered electrons 112 so as to prevent them from re-striking the anode 90. For example, as shown in FIG. 5, the surface 116 may have a shape, e.g., cylindrical, spherical, rectangular, etc., that occupies space intercepting possible trajectories/paths of the backscattered electrons 112. In embodiments, the surface 116 defines a cavity 118 within which the electron beam 106 strikes the anode 90. As will be understood, backscattered electrons 112 that intercept/strike the surface 116 are subsequently absorbed by the body 114 such that their kinetic energy is transformed into heat.

As will be appreciated, the body 114 may also serve as a collimator with respect to the X-rays 40 emitted from the anode 90. For example, as further shown in FIG. 5, the body 114 may include an aperture 120 that aligns with apertures 82 (FIG. 3) and 94 (FIG. 4) such that X-rays 40 having a trajectory/path aligned with the apertures 82, 94, and 120 may pass through the body 114, vacuum vessel 86 (FIG. 4), and fluid container 66 (FIG. 3), while X-rays 40 having trajectory/paths not aligned with the apertures 82, 82, and 120 are restricted from passing through the body 114. In embodiments, the electron collector 92 collimates the generated X-ray 40 such that the X-rays 40 passing through the apertures 82, 94, and 120 define a beam with a sharp edge. In certain aspects, the electron collector 92 may include additional radiation shielding, e.g., lead, in the casing of an insert that surrounds the ray generator 33.

Moving to FIG. 6, the system for protecting the transformer 12, in accordance with an embodiment of the present invention, is shown. The system 12 includes an inductor 122 and a resistor 124. The inductor 122 is disposed between the transformer 14 and a load 126, e.g., the electromagnetic ray generator 33 (FIG. 4), powered by the transformer 14. As will be understood, the depicted coil 127 and depicted resistor 129 represent the inductance and resistance, respectively, of the inductor 122. The resistor 124 is electrically disposed in parallel with the inductor 122 between the transformer 14 and the load 126. In embodiments, the inductor 122 and the resistor 126 may form a damping circuit 128.

As will be understood, the load 126 is depicted in FIG. 6 as symbolic representation of the electromagnetic ray generator 33 (FIG. 4) in which the resistor 130 represents the load of the electromagnetic ray generator 33 on the transformer 14 during normal current conditions, i.e., non-spit and/or "exposure current" conditions, and in which the closing of switch 132, modulated via control voltage source 134, represents short circuits, i.e., spit current, conditions. Accordingly, during normal current conditions, an electrical DC current flows from the transformer 14 to the damping circuit 128 via wire 136, from the damping circuit 128 to resistor 130 via wires 138 and 140, and from the resistor 130 back to the transformer 14 via wires 142 and 144. During a simulated short circuit, i.e., spit current conditions, the switch 132 is modulated, e.g., closed, via control voltage source 134 such that an AC electrical current flows from the load 126 through the damping circuit 128.

As will be appreciated, during normal current/exposure current conditions, most of the electrical current passing through the damping circuit 128 flows through the inductor 122, as opposed to the resistor 124, and thus experiences zero (0), or near zero, resistance from the damping circuit 128. In contrast, during short circuit conditions, i.e., spit conditions, the AC current generated by the load 126 is restricted by the impedance of the inductor 122 and, in some embodiments, by the resistance of the resistor 124 as well, which in turn, protects the transformer 14 from damage that would normally occur if the AC current from the load 126 were allowed to flow to the transformer 14 un-impeded. In other words, in embodiments, the equivalent resistance of the damping circuit 128 may be about zero (0) kOhm during normal current conditions, while the equivalent impedance of the damping circuit 128 hinders/restricts/resists the flow of any AC current generated by short circuits/spit currents to the transformer 14. As used herein with respect to the inductor 122, the resistor 124 and/or the damping circuit 128, the term "equivalent impedance" refers to the collective impedance of the inductor 122 and the resistor 124 as measured across the damping circuit 128. Similarly, as used herein with respect to the inductor 122, the resistor 124, and/or the damping circuit 128, the term "equivalent resistance" refers to the collective resistance of the inductor 122 and the resistor 124 as measured across the damping circuit 128.

As will be understood, the equivalent impedance of the damping circuit 128 may be based at least in part on the frequency of the AC current generated by the load 126 during short circuit/spit current conditions. For example, as shown in FIG. 7, if the resistance of the resistor 124 is held constant at one-point-four (1.4) kOhm, the equivalent impedance of the damping circuit 128 increases from zero (0) Ohm to fourteen-hundred (1,400) Ohm as the frequency of the AC/spit current increases from 1,00 E+s2 Hz to 1,000 E+06 Hz, respectively.

Accordingly, in embodiments, the resistor 124 and the inductor 122, i.e., the damping circuit 128, may have/produce/be configured to generate an equivalent impedance of between about sixteen (16) Ohm to about one-point-eight (1.8) kOhm, (e.g., 16 Ohm at 1 kHz, two-hundred-and-forty-seven (247) Ohm at fifty (50) kHz, one-point-four (1.4) kOhm at 3 Mhz, one-point-eight (1.8) kOhm at >3 gHz), and/or an equivalent resistance of between about zero (0) kOhm to about two (2) kOhm. In embodiments, the equivalent impedance of the inductor 122 and the resistor 124 may be about one-point-five (1.5) kOhm, and/or the equivalent resistance of the inductor 122 and the resistor 124 may be about zero (0) kOhm, respectively.

As will be appreciated, the equivalent impedance of the damping circuit 128 may also be based at least in part on the inductance of the inductor 122. Accordingly, the inductor 122 may have an inductance of between about one-point-three (1.3) mH to about one-point-four (1.4) mH, e.g., one-point-three-six (1.36) mH at 1 kHz. In some embodiments, the inductor 122 may have an inductance of about one-point-three (1.3) mH or about one-point-three-six (1.36) mH at 1 kHz, or about one-point-twelve (1.12) mH at 1 GHz.

Additionally, in embodiments, the inductor 122 may be made of/from and/or include NiZn ferrite. The use of NiZn ferrite, which may have an impedance of about ten (10) mOhm, for the inductor 122 may provide for higher inductance as compared to an air core inductor, which, as illustrated in FIG. 8, may further provide for the inductor 122 and/or the damping circuit 122 to have a small form factor.

As will also be appreciated, the equivalent impedance of the damping circuit 128 may also be based at least in part on the resistance of the resistor 124. Accordingly, in embodiments, the resistor 124 may have a resistance of between about one-point-seven (1.7) kOhm to about one-point-nine (1.9) kOhm. In some embodiments, the resistor 124 may have a resistance of about one-point-eight (1.8) kOhm.

Finally, it is also to be understood that the systems 10 and/or 12 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be accomplished in real-time. For example, as previously mentioned, the systems may include at least one processor and system memory/data storage structures, which may include random access memory (RAM) and read-only memory (ROM). The at least one processor of the system may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium," as used herein, refers to any medium that provides or participates in providing instructions to the at least one processor of the systems 10 and/or 12 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for protecting a transformer is provided. The system includes an inductor electrically disposed between the transformer and a load powered by the transformer, and a resistor electrically disposed in parallel with the inductor between the transformer and the load. In certain embodiments, the resistor and the inductor have an equivalent impedance of between about sixteen (16) Ohm to about one-point-eight (1.8) kOhm and an equivalent resistance of between about zero (0) kOhm to about two (2) kOhm. In certain embodiments, the equivalent impedance and equivalent resistance of the inductor and the resistor are about one-point-five (1.5) kOhm and about zero (0) kOhm, respectively. In certain embodiments, the resistor has a resistance of between about one-point-seven (1.7) kOhm to about one-point-nine (1.9) kOhm. In certain embodiments, the resistor has a resistance of about one-point-eight (1.8) kOhm. In certain embodiments, the inductor has an inductance of between about one-point-three (1.3) mH to about one-point-four (1.4) mH. In certain embodiments, the inductor has an inductance of about one-point-three-six (1.36) mH. In certain embodiments, the inductor includes NiZn ferrite. In certain embodiments, the load is an X-ray generation device.

Other embodiments provide for a method for protecting a transformer. The method includes powering a load with the transformer such that a DC electrical current flows from the transformer through a damping circuit to the load. The damping circuit includes an inductor and a resistor electrically disposed in parallel between the transformer and the load. In certain embodiments, the method incudes providing an equivalent impedance of between about sixteen (16) Ohm to about one-point-eight (1.8) kOhm via the damping circuit based at least in part on an AC current corresponding to a short circuit within the load. In such embodiments, the damping circuit has an equivalent resistance of between about zero (0) kOhm to about two (2) kOhm. In certain embodiments, the equivalent impedance and the equivalent resistance of the damping circuit are about one-point-five (1.5) kOhm and about zero (0) kOhm, respectively. In certain embodiments, the resistor has a resistance of between about one-point-seven (1.7) kOhm to about one-point-nine (1.9) kOhm. In certain embodiments, the inductor has an inductance of between about one-point-three (1.3) mH to about one-point-four (1.4) mH. In certain embodiments, the inductor includes NiZn ferrite.

Yet still other embodiments provide for an electromagnetic ray generator. The electromagnetic ray generator includes an electron emitter, a transformer, an anode, an inductor, and a resistor. The electron emitter is operative to emit electrons. The transformer is operative to provide power to the electron emitter. The anode is operative to receive electrons emitted by the electron emitter and to convert kinetic energy of the electrons into electromagnetic rays. The inductor is electrically disposed between the transformer and the electron emitter. The resistor is electrically disposed in parallel with the inductor between the transformer and the electron emitter. In certain embodiments, the resistor and the inductor have an equivalent impedance of between about sixteen (16) Ohm to about one-point-eight (1.8) kOhm and an equivalent resistance of between about zero (0) kOhm to about two (2) kOhm. In certain embodiments, the equivalent impedance and the equivalent resistance are about one-point-five (1.5) kOhm and about zero (0) kOhm, respectively. In certain embodiments, the electromagnetic rays are X-rays. In certain embodiments, the electron emitter and anode are disposed in an imaging device.

Accordingly, by forming a damping circuit from a resistor and an inductor electrically disposed in parallel between a transformer and a load, some embodiments of the present invention provide for a damping circuit that protects the transformer from short circuits/spit currents, generated by the load, with improved power efficiency over a damping circuit that does not include a resistor electrically disposed in parallel with an inductor. In other words, some embodiments of the present invention may provide for a damping circuit that has an equivalent impedance, e.g., about one-point-five (1.5) kOhm, during AC short circuits/spit currents while having little or no resistance, e.g., zero (0) kOhm, during normal operating conditions, i.e., DC exposure current.

For example, shown in FIG. 9 is a chart that depicts the electrical current 146 flowing in the circuit formed by the transformer 14 (FIG. 6), the damping circuit 128 (FIG. 6), and the load 126 (FIG. 6), in accordance with an embodiment of the present invention, against an electrical current 148 flowing in a comparable circuit formed by a transformer and a load, but where only a resistor is electrically disposed in serial between the transformer and the load. As can be seen in FIG. 9, while both currents 146 and 148 behave similarly during a short circuit/spit current (represented by peak 150), the current 146 of the present invention experiences a reduced loss during normal operating conditions due to the lower overall effective resistance provided by the alternate path through the inductor 122 (FIG. 6).

Thus, as will be appreciated, some embodiments of the present invention provide for an electromagnetic ray generator, and/or encompassing imaging device, that has improved imaging capabilities due to a higher/more powerful tube current, than traditional imaging systems, but which is able to operate off of existing hospital power supplies/jacks/ports, e.g., wall power outlets. In other words, some embodiments of the present invention provide for more powerful imaging systems that can operate of off traditional/existing power supplies typically found in most medical environments.

Additionally, in some embodiments, the resistor provides a path for the releases of stored inductor energy, i.e., energy stored in the electromagnetic field generated by the inductor during AC short circuit/spit current conditions, which in turn, may limit any overvoltage of the transformer and/or load.

Further, by storing some of the electromagnetic energy of a short circuit/spit current in an inductor electrically disposed in parallel with a resistor, as opposed to relying on a damping circuit formed by a serial resistor to protect a transformer, some embodiments of the present invention provide for a damping circuit with improved thermal management, i.e., a reduction in generated heat. In other words, the inductor of some embodiments can store a portion of the electromagnetic energy of a short circuit/spit current and then release it back into the circuit over time, as opposed to radiating most of the electromagnetic energy from a short circuit/spit current as thermal energy. Thus, some embodiments of the present invention may balance the increase of losses inside the transformer due to an increase in the power of the tube current.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for protecting a transformer comprising:
an inductor electrically disposed in series between the transformer and a load containing a cathode and a anode powered by DC current provided by the transformer; and,
a resistor electrically disposed in parallel with the inductor between the transformer and the load.

2. The system of claim 1, wherein the resistor and the inductor have an equivalent impedance of between about 16 Ohm to about 1.8 kOhm and an equivalent resistance of between about zero kOhm to about 2 kOhm.

3. The system of claim 2, wherein the equivalent impedance and equivalent resistance of the inductor and the resistor are about 1.5 kOhm and about zero kOhm, respectively.

4. The system of claim 1, wherein the resistor has a resistance of between about 1.7 kOhm to about 1.9 kOhm.

5. The system of claim 4, wherein the resistor has a resistance of about 1.8 kOhm.

6. The system of claim 1, wherein the inductor has an inductance of between about 1.3 mH to about 1.4 mH.

7. The system of claim 6 wherein the inductor has an inductance of about 1.36 mH.

8. The system of claim 1, wherein the inductor comprises of NiZn ferrite.

9. The system of claim 1, wherein the load is an X-ray generation device.

10. A method for protecting a transformer comprising:
powering a load containing a cathode and an anode with the transformer such that a DC electrical current flows from the transformer through a damping circuit to the load; and
wherein the damping circuit includes an inductor and a resistor electrically disposed in parallel and the inductor and resistor disposed in series between the transformer and the load.

11. The method of claim 10 further comprising:
providing an equivalent impedance of between about 16 Ohm to about 1.8 kOhm via the damping circuit based at least in part on an AC current corresponding to a short circuit within the load; and
wherein the damping circuit has an equivalent resistance of between about 0 kOhm to about 2 kOhm.

12. The method of claim 11, wherein the equivalent impedance and the equivalent resistance of the damping circuit are about 1.5 kOhm and about zero kOhm, respectively.

13. The method of claim 10, wherein the resistor has a resistance of between about 1.7 kOhm to about 1.9 kOhm.

14. The method of claim 10, wherein the inductor has an inductance of between about 1.3 mH to about 1.4 mH.

15. The method of claim 10, wherein the inductor comprises NiZn ferrite.

16. An electromagnetic ray generator comprising:
an electron emitter containing a cathode and an anode operative to emit electrons;
a transformer operative to provide power via DC current to the electron emitter;
the anode operative to receive electrons emitted by the electron emitter and to convert kinetic energy of the electrons into electromagnetic rays;
an inductor electrically disposed in series between the transformer and the electron emitter; and
a resistor electrically disposed in parallel with the inductor between the transformer and the electron emitter.

17. The electromagnetic ray generator of claim 16, wherein the resistor and the inductor have an equivalent impedance of between about 16 Ohm to about 1.8 kOhm and an equivalent resistance of between about zero kOhm to about 2 kOhm.

18. The electromagnetic ray generator of claim 17, wherein the equivalent impedance and the equivalent resistance are about 1.5 kOhm and about zero kOhm, respectively.

19. The electromagnetic ray generator of claim 16, wherein the electromagnetic rays are X-rays.

20. The electromagnetic ray generator of claim 16, wherein the electron emitter and anode are disposed in an imaging device.

* * * * *